US012613892B2

(12) United States Patent
Hong et al.

(10) Patent No.: US 12,613,892 B2
(45) Date of Patent: Apr. 28, 2026

(54) SYSTEM AND METHOD FOR LEARNING AND COMMUNICATING IMPLICIT STYLISTIC PREFERENCES FROM HISTORICAL USER INTERACTION DATA IN TEXT-TO-IMAGE PROMPT ENGINEERING

(71) Applicant: TOYOTA RESEARCH INSTITUTE, INC., Los Altos, CA (US)

(72) Inventors: Matthew K. Hong, Los Altos, CA (US); Heishiro Toyoda, Los Altos, CA (US); Yin-Ying Chen, Los Altos, CA (US); Shabnam Hakimi, Los Altos, CA (US); Matthew Klenk, Los Altos, CA (US)

(73) Assignees: TOYOTA RESEARCH INSTITUTE, INC., Los Altos, CA (US); TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/528,655

(22) Filed: Dec. 4, 2023

(65) Prior Publication Data

US 2025/0181612 A1      Jun. 5, 2025

(51) Int. Cl.
G06F 16/535          (2019.01)
G06F 16/332          (2019.01)
(Continued)

(52) U.S. Cl.
CPC ........ G06F 16/3328 (2019.01); G06F 16/535 (2019.01); G06F 16/54 (2019.01); G06T 11/00 (2013.01)

(58) Field of Classification Search
None
See application file for complete search history.

(56) References Cited

U.S. PATENT DOCUMENTS 12,154,021 B1 *  11/2024  Sternberg ........... G06Q 30/0643
2012/0296897 A1  11/2012  Xin-Jing
(Continued)

FOREIGN PATENT DOCUMENTS

CN          110532571        12/2019
CN          110751698        2/2020
(Continued)

OTHER PUBLICATIONS

Paananen et al., "Using Text-to-Image Generation for Architectural Design Ideation," arXiv:2304.10182v1 [cs.HC], Apr. 20, 2023, 14 pages (https://doi.org/10.48550/arXiv.2304.10182).
(Continued)

*Primary Examiner* — Thu N Nguyen
(74) *Attorney, Agent, or Firm* — SHEPPARD, MULLIN, RICHTER & HAMPTON LLP; Daniel N. Yannuzzi

(57) ABSTRACT

Systems and methods are provided for implementing stylistic preferences into an image generation model with an accompanying user interface. The system can generate a plurality of images for each of a plurality of user prompts received from a first user and relate each plurality of images to the other pluralities of images. The user interface can selecting a preferred plurality of images from the pluralities of images based on input from a second user and display the pluralities of images in a node tree diagram indicating the preferred plurality of images.

20 Claims, 7 Drawing Sheets

(51) Int. Cl.
    *G06F 16/54*          (2019.01)
    *G06T 11/00*         (2006.01)

(56)           References Cited

U.S. PATENT DOCUMENTS

| | | | |
|---|---|---|---|
| 2020/0226411 A1* | 7/2020 | Gupta | G06F 18/217 |
| 2023/0105483 A1* | 4/2023 | Rittman | H04L 9/0833 |
| | | | 705/37 |
| 2023/0177810 A1 | 6/2023 | Xu | |
| 2024/0193821 A1* | 6/2024 | Denison | G06F 40/40 |
| 2024/0320867 A1* | 9/2024 | Bean | G06T 11/00 |
| 2024/0338860 A1* | 10/2024 | Trzyna | G06F 40/44 |

FOREIGN PATENT DOCUMENTS

| | | |
|---|---|---|
| CN | 113837229 | 12/2021 |
| CN | 114638905 | 6/2022 |
| CN | 115018941 | 9/2022 |
| CN | 115700519 | 2/2023 |
| CN | 116246062 | 6/2023 |
| WO | 2019052403 | 3/2019 |

OTHER PUBLICATIONS

Soatto et al., "Taming AI Bots: Controllability of Neural States in Large Language Models," arXiv:2305.18449v1 [cs.AI], May 29, 2023, 30 pages (https://doi.org/10.48550/arXiv.2305.18449).

* cited by examiner

Wooden Rocking Chairs with Angler Fish Style Reading Light

212a

Blue Wooden Rocking Chairs with Overhead Reading Lights

212b

202b

Wooden Rocking chairs with Overhead Reading Lights

Red Wooden Rocking Chairs with Reading Lights

Wooden Rocking chairs with Reading Light

210a

Metal Rocking Chairs

Wooden Rocking Chairs

202a

Rocking Chairs

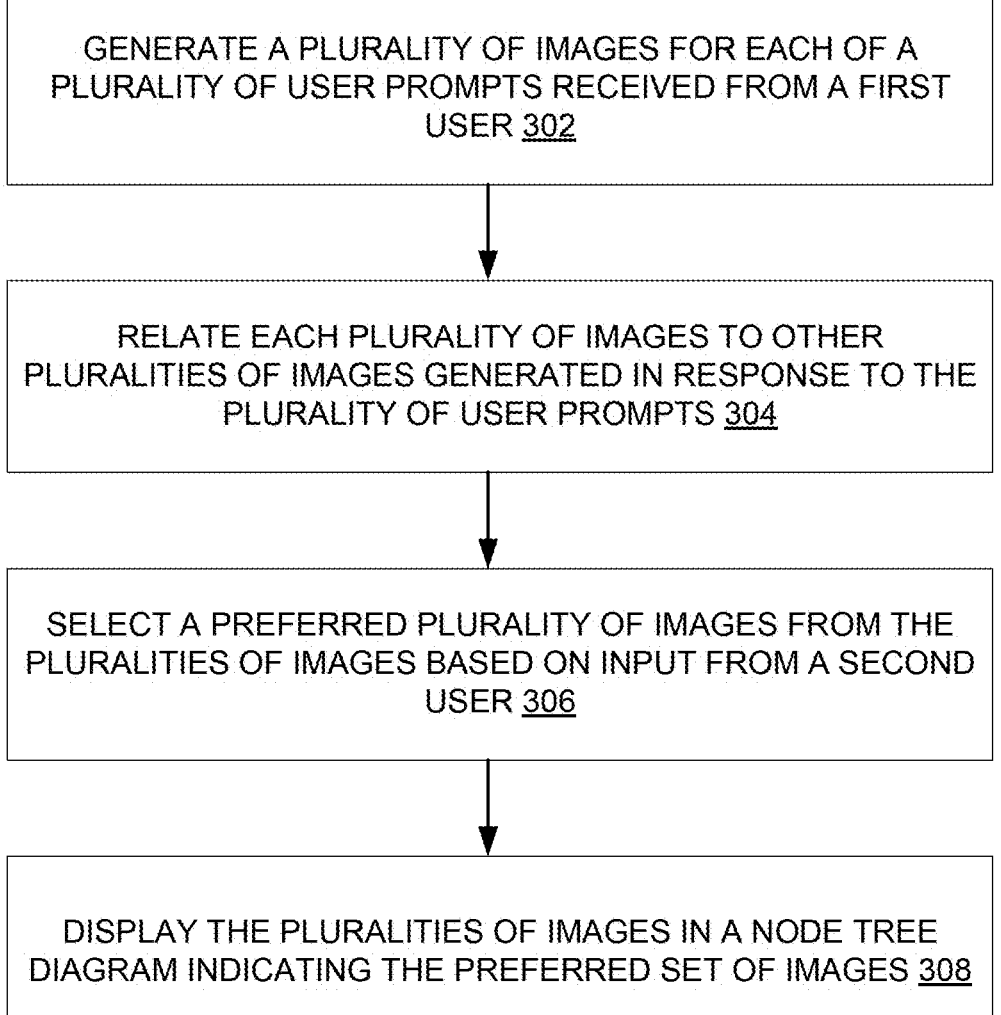

GENERATE A PLURALITY OF IMAGES FOR EACH OF A PLURALITY OF USER PROMPTS RECEIVED FROM A FIRST USER 302

RELATE EACH PLURALITY OF IMAGES TO OTHER PLURALITIES OF IMAGES GENERATED IN RESPONSE TO THE PLURALITY OF USER PROMPTS 304

SELECT A PREFERRED PLURALITY OF IMAGES FROM THE PLURALITIES OF IMAGES BASED ON INPUT FROM A SECOND USER 306

DISPLAY THE PLURALITIES OF IMAGES IN A NODE TREE DIAGRAM INDICATING THE PREFERRED SET OF IMAGES 308

FIG. 3

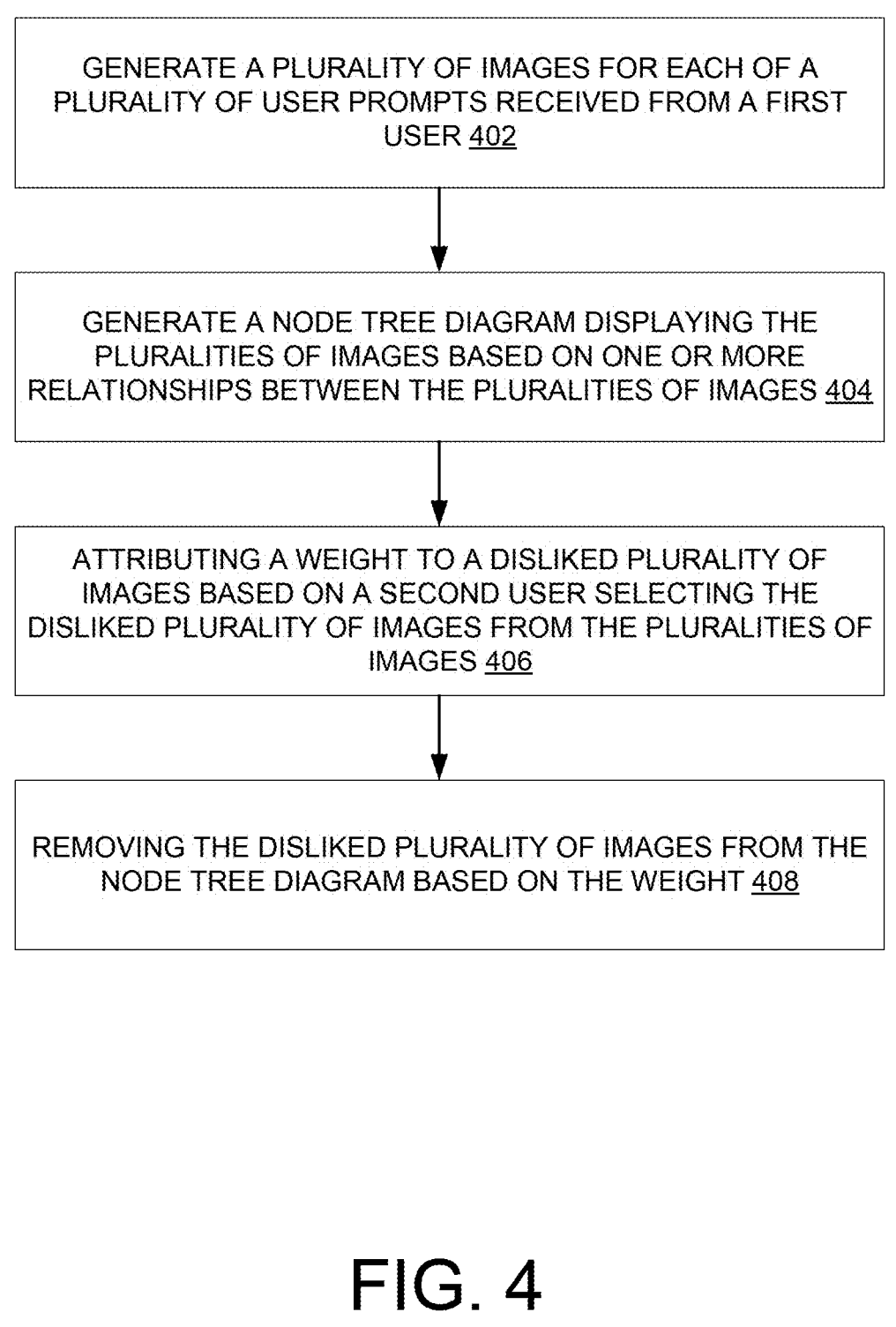

GENERATE A PLURALITY OF IMAGES FOR EACH OF A PLURALITY OF USER PROMPTS RECEIVED FROM A FIRST USER 402

GENERATE A NODE TREE DIAGRAM DISPLAYING THE PLURALITIES OF IMAGES BASED ON ONE OR MORE RELATIONSHIPS BETWEEN THE PLURALITIES OF IMAGES 404

ATTRIBUTING A WEIGHT TO A DISLIKED PLURALITY OF IMAGES BASED ON A SECOND USER SELECTING THE DISLIKED PLURALITY OF IMAGES FROM THE PLURALITIES OF IMAGES 406

REMOVING THE DISLIKED PLURALITY OF IMAGES FROM THE NODE TREE DIAGRAM BASED ON THE WEIGHT 408

FIG. 4

SYSTEM AND METHOD FOR LEARNING AND COMMUNICATING IMPLICIT STYLISTIC PREFERENCES FROM HISTORICAL USER INTERACTION DATA IN TEXT-TO-IMAGE PROMPT ENGINEERING

TECHNICAL FIELD

The present disclosure relates generally to text to image generation, and in particular, some implementations may relate to using machine learning models to generate related images for use in design or other projects while incorporating the stylistic preferences of a client user.

DESCRIPTION OF RELATED ART

Designers and creative individuals are increasingly adopting emerging generative AI-based creativity tools to inspire their work. A key mechanism that enables text-to-image generation is prompt engineering, which describes a process wherein users input curated text prompts in exchange for an image that contains visual concepts expressed in text. While exploring design concepts using these tools, designers need to curate their prompts and searches to account for the client's stylistic preferences. Traditional text-to-image generation tools limit user interactions to trial-and-error approaches to generate envisioned images that align with a designer's creative curiosity.

BRIEF SUMMARY OF THE DISCLOSURE

According to various embodiments of the disclosed technology, a method can comprise generating a plurality of images for each of a plurality of user prompts received from a first user; relating each plurality of images to other pluralities of images generated in response to the plurality of user prompts; selecting a preferred plurality of images from the pluralities of images based on input from a second user; and displaying the pluralities of images in a node tree diagram indicating the preferred plurality of images.

In some embodiments, the method further comprises determining an additional user prompt from the first user corresponds to the preferred plurality of images; generating an additional plurality of images; and adding the additional plurality of images to the node tree diagram as being related to the preferred plurality of images.

In some embodiments, the method further comprises determining that the additional plurality of images is a second preferred plurality of images based on user input from the second user.

In some embodiments, the second user selects the preferred plurality of images from the node tree diagram.

In some embodiments, a machine learning model generates the pluralities of images based on the plurality of user prompts.

In some embodiments, the method further comprises determining that a plurality of images is a disliked plurality of images based on user input from the second user.

In some embodiments, the method further comprises attributing a positive weight to the preferred plurality of images and attributing a negative weight to the disliked plurality of images.

In some embodiments, the method further comprises removing the disliked plurality of images from the node tree diagram based on the negative weight.

According to various embodiment of the disclosed technology, a user interface can comprise a processor and a memory encoded with instructions, which when executed by the processor, causes the processor to generate a plurality of images for each of a plurality of user prompts received from a first user; generate a node tree diagram displaying the pluralities of images based on one or more relationships between the pluralities of images; attribute a weight to a disliked plurality of images based on a second user selecting the disliked plurality of images from the pluralities of images; and remove the disliked plurality of images from the node tree diagram based on the weight.

In some embodiments, a machine learning model generates the pluralities of images based on the plurality of user prompts.

In some embodiments, the processor is further configured to determine a preferred plurality of images based on a selection from the second user.

In some embodiments, the processor is further configured to generate additional pluralities of images based on the preferred plurality of images; determine preferred or disliked pluralities of images based on selections from the second user; attributing a weight to each selection; add preferred pluralities of images to the node tree diagram; and remove disliked pluralities of images from the node tree diagram.

In some embodiments, attributing the weight to the disliked plurality of images is based on the disliked plurality's relationship to other disliked pluralities of images.

In some embodiments, the processor is further configured to update the weight of the disliked plurality of images as the other disliked pluralities of images are added to the node tree diagram.

In some embodiments, removing the disliked plurality of images from the node tree diagram is based on the weight exceeding a threshold.

According to various embodiments of the disclosed technology, a non-transitory machine-readable medium can have instructions stored therein, which when executed by a processor, causes the processor to: generate a plurality of images for each of a plurality of user prompts received from a first user; relate each plurality of images to other pluralities of images generated in response to the plurality of user prompts; attribute a positive weight to a preferred plurality of images based on user selection from a second user; and display all pluralities of images in a node tree diagram indicating the preferred plurality of images and the positive weight.

In some embodiments, the processor is further configured to determine an additional user prompt from the first user corresponds to the preferred plurality of images; generate an additional plurality of images; and add the additional plurality of images to the node tree diagram as being related to the preferred plurality of images.

In some embodiments, the processor is further configured to determine that the additional plurality of images is a second preferred plurality of images based on additional user input from the second user.

In some embodiments, the second user selects the preferred plurality of images from the node tree diagram.

In some embodiments, the processor is further configured to attribute a negative weight to a disliked plurality of images based on additional input from the second user selecting the disliked plurality of images from the pluralities of images and display the disliked plurality of images on the node tree diagram with an indication of the negative weight.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 3 illustrates an example method incorporating the systems described herein.

FIG. 4 illustrates another example method incorporating the systems described herein.

The figures are not exhaustive and do not limit the present disclosure to the precise form disclosed.

DETAILED DESCRIPTION

Learning about a client's stylistic preferences early in the design process can determine the likelihood of achieving client satisfaction with fewer design generation and critique/feedback loops. Clients, however, may lack necessary training to effectively express their design ideas, which can lead to feedback that is unclear and challenging to interpret. Depending on the specific project, designers can use an array of design samples to probe their clients' stylistic preferences. However, clients' preferences are likely to change over time and offer little value when they are not grounded in the designers' works in progress.

The systems and methods described herein address issues with design review and feedback by providing a user interface that draws out a client's stylistic preference in an organized and accessible format for a designer. This user interface is applicable to any pair of users that can collaborate to set directions and constraints for a project, including employees and managers, project commissioners and clients, and/or groups of collaborating individuals. This user interface can accelerate the product development cycle by reducing the number of iterative feedback loops and related communication inefficiencies among key decision makers during an early concept design phase. As described above, traditional text to image systems do not take advantage of the trail of rich interaction history created by designers and clients. This trail presents new opportunities to infer stylistic preferences and intents before a concrete design direction has been formulated. Not only does this user interface learn the client's preferences, but it also learns how to best prompt the design system.

Systems and methods described herein predict and learn a client's implicit stylistic tastes using a deep learning framework that updates a computational model for personal graphic design style based on positive and negative selections from the client. The deep learning framework adapts to the client's preferences and provides the client with access to the designer's interaction history of text prompts and resulting images. The user interface provides an interactive visualization of the designer's interaction history, which both a client and designer can view and interact with asynchronously. The user interface provides multiple methods to visualize the relationship among visual concepts in a node-link style tree diagram, including semantic distance calculations among text prompts or a mix between semantic and chronological ordering of concepts expressed as text prompts.

Figure 1:
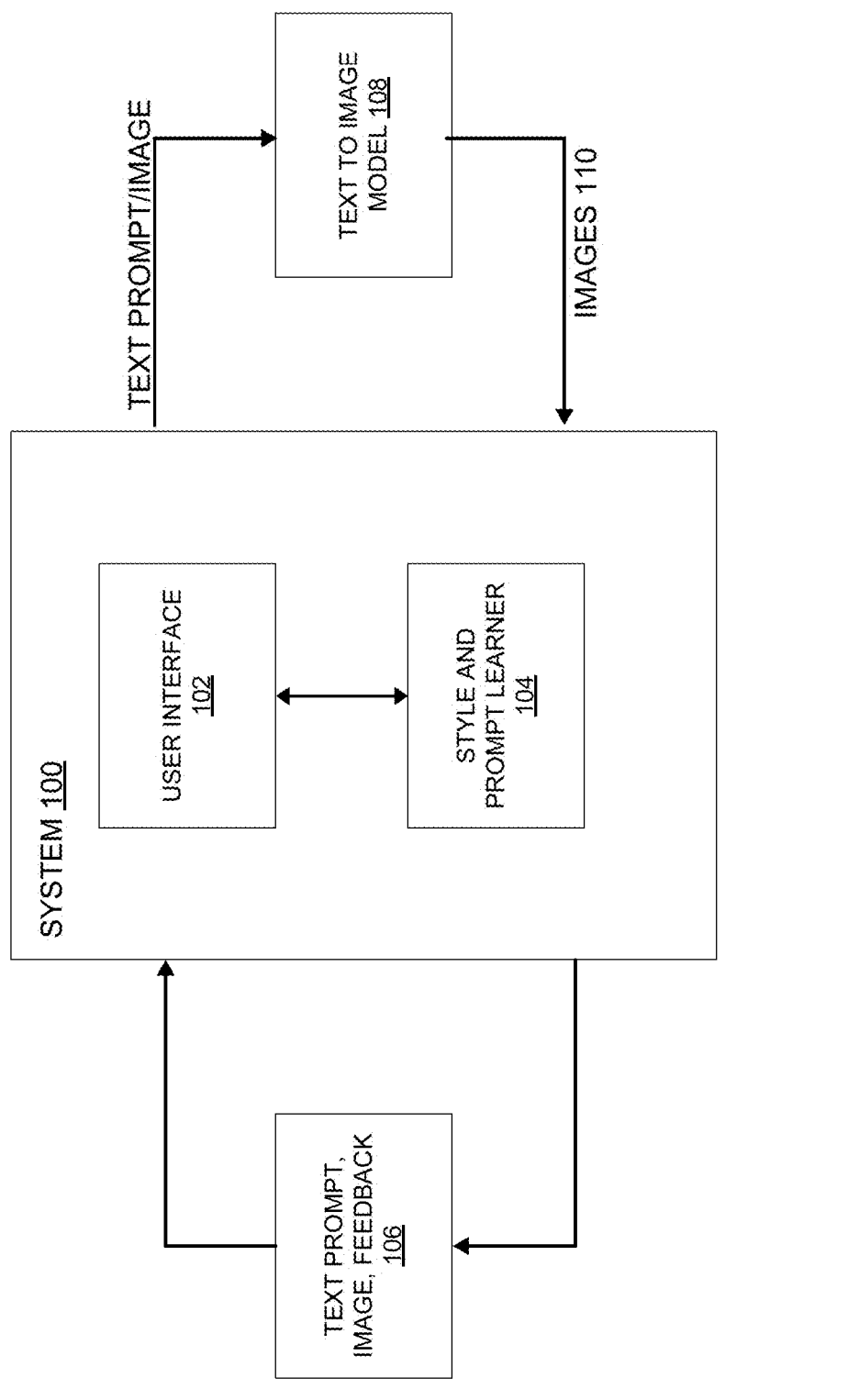
FIG. 1 illustrates an example system for learning user stylistic preferences in text to image generation in accordance with the embodiments disclosed herein.

FIG. 1 illustrates an example system for learning user stylistic preferences in text to image generation. System 100 can comprise a user interface 102 (illustrated further below in FIGS. 2A-2C) and a style and prompt learner 104. System 100 can receive text prompts, images, feedback, or other input 106 directed towards a targeted search. This search can be conducted by a designer user or client user to generate a history of searches and inspiration. For example, a designer user may enter a text prompt for "pull-out couches" to search for images of couches with pull out beds. Input 106 can be sent to text-to-image model 108 to generate images corresponding to the prompts. Text-to-image model 108 can comprise any image generation model that can receive input and generate images corresponding to the input. Resulting images 110 can be sent back to system 100 to be displayed on the user interface.

Figure 2A:
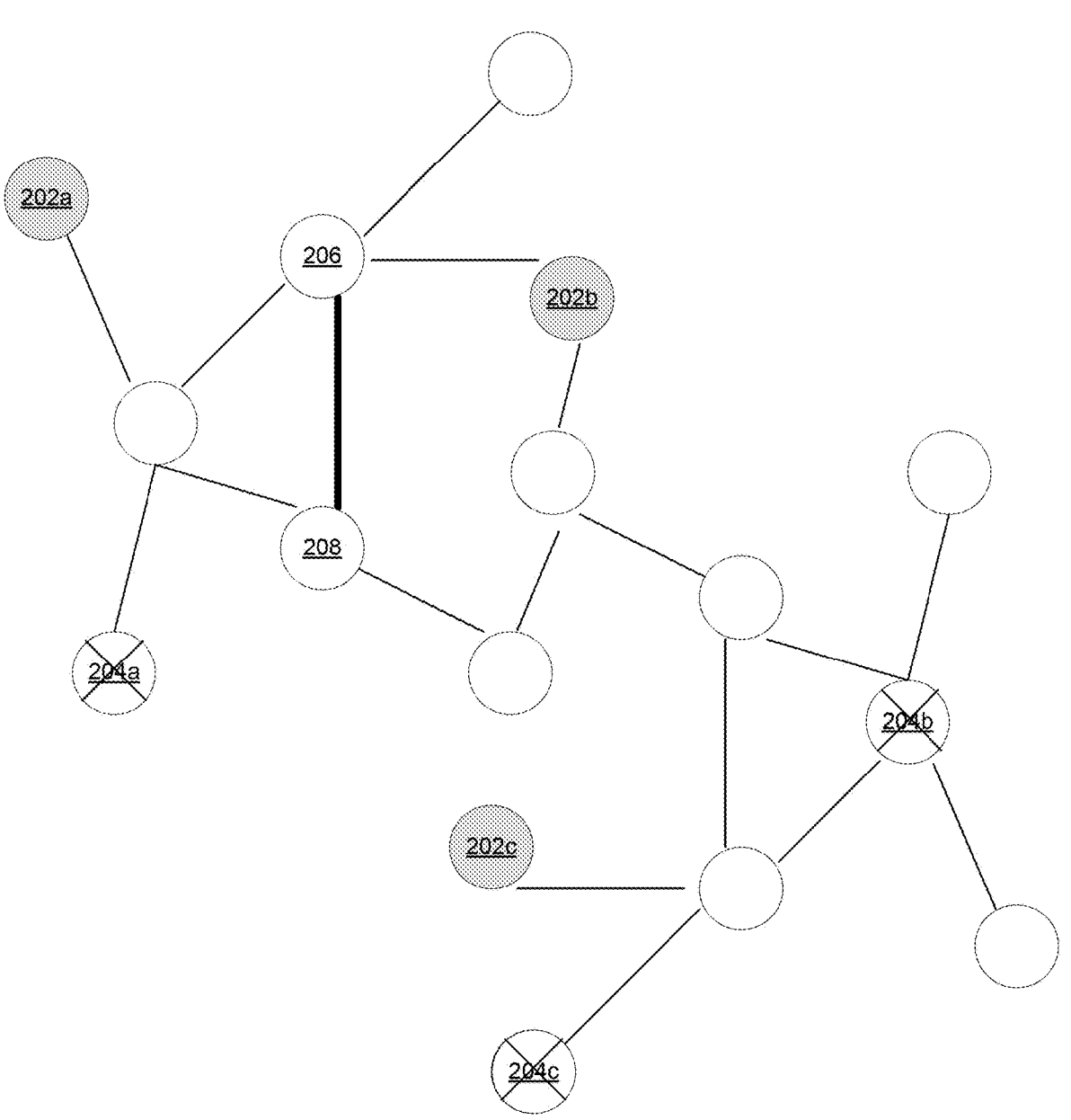
FIG. 2A illustrates an example node tree diagram in accordance with one embodiment.
Figure 2B:
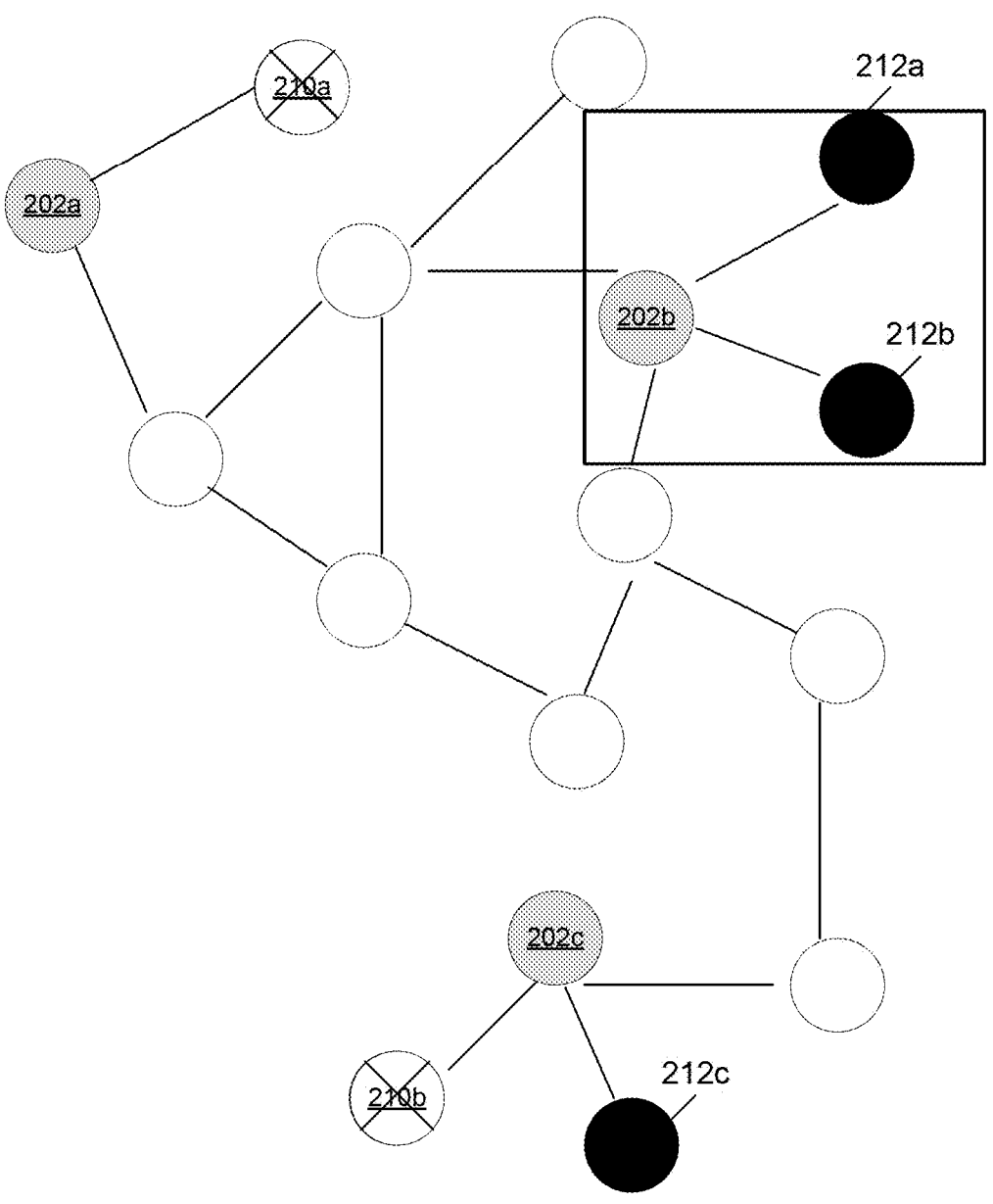
FIG. 2B illustrates the addition of additional sets of images to a node tree diagram in accordance with one embodiment.
Figure 2C:
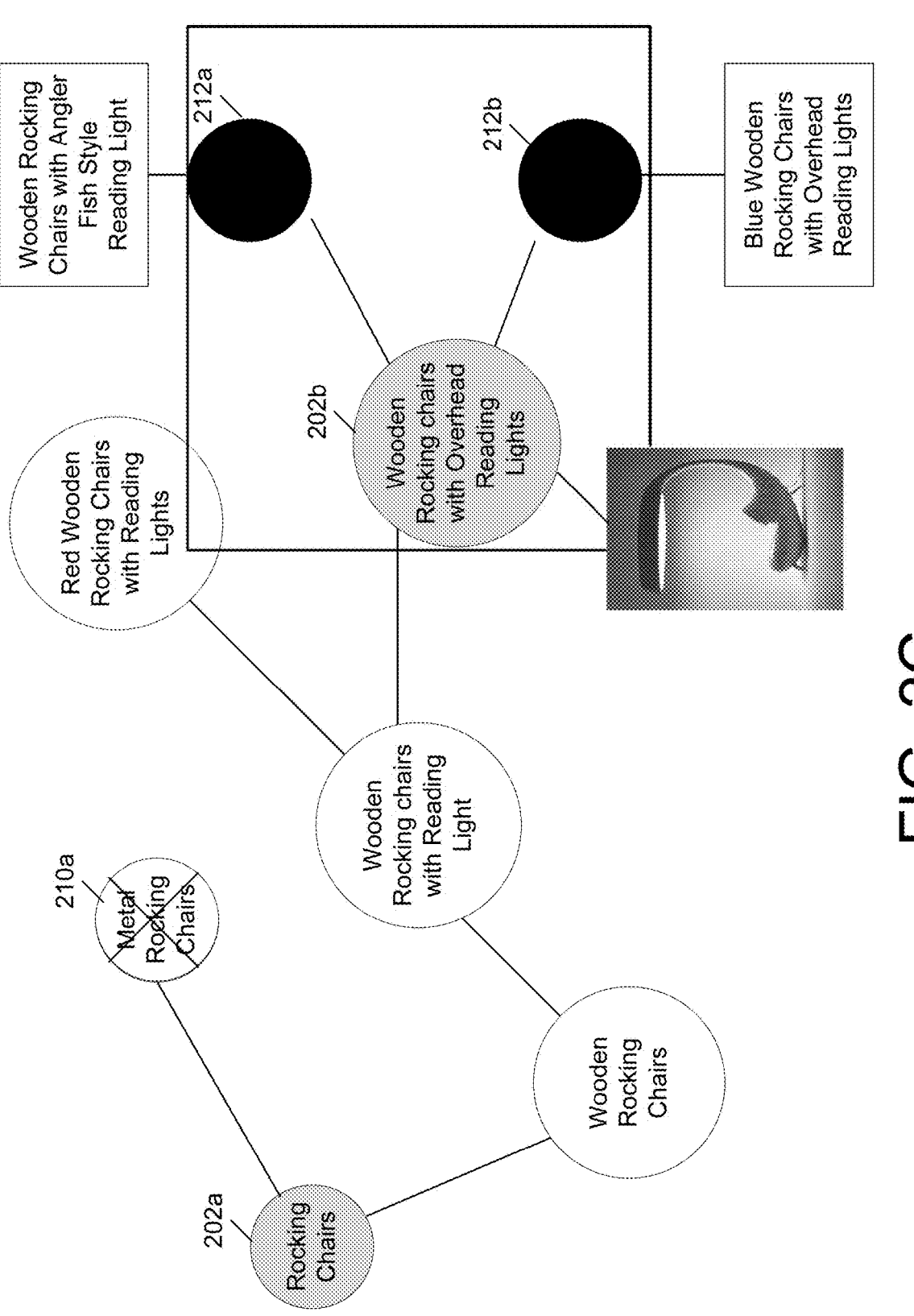
FIG. 2C illustrates example relationships in the node tree diagram in accordance with one embodiment.

User interface 102 can display resulting images 110 and the corresponding prompts leading to the resulting images. As illustrated in FIGS. 2A-2C, the display can correspond to a node link tree diagram. Style and prompt learner 104 can evaluate the relationships between inputs 106 and images 110 to generate relationships between the different searches. For example, style and prompt learner 104 may discern that a search for striped wallpaper is related to a search for patterned wallpaper because striped wallpaper is a kind of patterned wallpaper. User interface 102 can display these relationships between prompts and resulting images. As described further below, in the example of a node link tree diagram, the nodes can represent a prompt and resulting image set pair. The links between nodes can indicate the semantic relationship between prompts and images. The distances and lines between nodes can indicate the relationship between nodes. This indication can be displayed through different thickness of lines, different distances between nodes, or any other visual marker. In some embodiments, major semantic deviations with little shared meaning or text can comprise new branches of the node link tree diagram. Related prompts off these new branches can be expressed as linear timelines. In some embodiments, phrase level text descriptions of visual concepts can be shown along the tree diagram when fully zoomed out, from which the user can selectively zoom-in to focus on particular nodes and see the images up-close. Alternatively, images could be initially hidden from view until the user selects a node to display the images.

User interface 102 can comprise a module that requests a client user to choose how they wish to indicate their preferences. The client user can select a number of "preferred" image sets and a number of "disliked" image sets. Preferences can relate to how the client user feels about the images, how aesthetically pleasing the images are to the client user, or other indications of preference. In some embodiments, this preference may be binary choice of "liking" the set of images or "disliking" the set of images. In some embodiments, the user can select nodes that are preferred and select nodes that are disliked by clicking on the nodes as displayed in the node link tree diagram. Preferred nodes and disliked nodes can be highlighted using different colors, symbols, shading, or other visual indications. In some embodiments, the positive/negative degree of preference can be expressed in more granular terms. For example, the client user can be asked to rate the set of images on a scale (i.e., from one to five) or otherwise indicate a degree of preference. The client user may be asked to indicate preference on a percentage scale (i.e., from 0% meaning total dislike, to 100% meaning favorite). In some embodiments, user interface 102 can include modules to edit or change preferences. In some embodiments, style and prompt learner 104 can request a specific number of preferred and disliked image sets. In some embodiments, style and prompt leaner can request an equal number of disliked image sets and preferred image sets, while in other embodiments, style and prompt learner 104 may request more or less preferred image sets in comparison to disliked image sets. Style and prompt learner 104 can receive these preferences and update text to image model 108 to find newly generated images that are similar or different from preferred or disliked image sets.

Once the client user selects preferences, system 100 can display the preferences to the designer user. In some embodiments, either the client user or designer user can add comments to the nodes to further describe preferences or ideas. The designer user can tailor additional prompts to the highlighted preferences. In some embodiments, system 100 can automatically generate additional prompts and image sets based on the client user's preferences. New prompts and image sets can be added as additional nodes to the node link tree diagram. As new nodes are added, the client user can be asked again to select preferences in the nodes. System 100 can update the model every time the user selects additional or new preferences or may update in time intervals depending on how often the client user updates preferences. In some embodiments, a weight can be attributed to preferred and/or disliked image sets. The weight can correspond to the degree of preference or can relate to the image set's semantic relationships with other preferred or disliked image sets. The weight can be updated as additional nodes are added to the node link tree diagram. In some embodiments, if a disliked set of images has a weight exceeding a negative threshold, the corresponding node may be removed from the node link tree diagram, grayed out, or otherwise shaded/highlighted to indicate that it is no longer considered as part of the node link tree diagram. Conversely, preferred sets of images with higher positive weights may be additionally highlighted to illustrate that the set has a higher preference weight than other sets of images. Once a final concept is determined, user interface 102 may highlight the most preferred node or freeze the node link tree diagram to indicate that the client user's preferences has been sufficiently narrowed.

FIG. 2A illustrates an example node link tree diagram as displayed on a user interface (e.g., user interface 102). Preferred nodes and disliked nodes can be indicated by color, shading, patterns, gradients, or other visual indications. In the example of FIG. 2A, nodes 202a-c are shaded to indicate that they are preferred nodes. In the example of FIG. 2A, the preference is a binary selection; however, as described above, different levels of preferences can be applied. Different levels of preferences can be indicated by varying visual indicators on the node link tree diagram. Nodes 204a-c are marked with an "X" to indicate that they are disliked nodes. As described above, the semantic differences between nodes can be illustrated in various ways. In some embodiments, the distances between nodes can indicate the attenuation in their relationship. In other embodiments, visual indicators on the lines linking nodes can indicate the semantic differences. For example, in the example of FIG. 2A, there is a thicker line linking nodes 206 and 208 than the line linking nodes 206 and 202b. The thickness in the lines can indicate a closer relationship. Therefore, in the example of FIG. 2A, nodes 206 and 208 have a closer relationship than that between nodes 206 and 202b.

FIG. 2B illustrates an extension of the node link tree diagram of FIG. 2A. In the example of FIG. 2B, additional nodes can be added to the node link tree diagram as additional prompts/image sets are generated. In some embodiments, the designer user can manually add new prompts, while in some embodiments, the system may generate image sets and prompts automatically based on the user's selected nodes and preferences. If the designer user manually adds new prompts, the system can attribute those new prompts to the preferred nodes based on the semantic differences between the nodes. In the example of FIG. 2B, the system can automatically generate new nodes based on the preferred nodes. Here, the system generated new nodes 210a-b and 212a-c. These nodes can be generated because they are related to preferred nodes 202a-c. The client user can select additional preferred and disliked nodes based on the added nodes. In the example of FIG. 2B, the client user can indicate that they disliked nodes 210a-b and preferred nodes 212a-c. This process can be repeated as new nodes are added. Note, in the example of FIG. 2B, disliked nodes 204a-c have been removed. As described above, disliked nodes can be removed based on the delineated preferences, weights, or other indications from the client user or designer user. Here, nodes 204a-c have been removed because the client user selected them as disliked nodes.

FIG. 2C illustrates a close-up view of the node link tree diagram of FIG. 2B. As described above, a user can zoom in on a portion of the node link tree diagram to see additional information related to individual nodes. The user can click on nodes to see the full set of images and the prompt associated with the set of images. In the example of FIG. 2C, the prompts are provided so the user can see the relationships between nodes. Here, the client user has indicated that they have a preference for "Wooden Rocking Chairs with Angler Fish Style Reading Light" and "Blue Wooden Rocking Chairs with Overhead Reading Lights." In some embodiments, when the system generates additional nodes automatically, the system may generate combinations of preferred nodes to generate image sets that incorporate multiple aspects of the client user's preferences. For example, if an additional node were created, it may be related to nodes 212a and 212b. This node may be associated with the prompt "Blue Wooden Rocking Chairs with Angler Fish Style Reading Light" to incorporate aspects of both nodes 212a and 212b. If the user selects this new node as a preferred node, the system can generate additional combinations of preferred nodes until the user's preferences are sufficiently detailed.

FIG. 3 illustrates an example method incorporating the systems described above. At block 302, the system can generate a plurality of images for each of a plurality of user prompts received from a first user. As described above, the system can receive text prompts, images, feedback, or other input 106 directed towards a targeted search. This search can be conducted by a designer user or client user to generate a history of searches and inspiration. The input can be sent to a text-to-image model to generate images corresponding to the prompts. The text-to-image model can comprise any image generation model that can receive input and generate images corresponding to the input. Resulting images can be sent back to system 100 to be displayed on the user interface.

At block 304, the system can relate each plurality of images to other pluralities of images generated in response to the plurality of user prompts. As described above, the links between nodes can indicate the semantic relationship between prompts and images. The distances and lines between nodes can indicate the relationship between nodes. This indication can be displayed through different thickness of lines, different distances between nodes, or any other visual marker. In some embodiments, major semantic deviations with little shared meaning or text can comprise new branches of the node link tree diagram. Related prompts off these new branches can be expressed as linear timelines. In some embodiments, phrase level text descriptions of visual concepts can be shown along the tree diagram when fully zoomed out, from which the user can selectively zoom-in to focus on particular nodes and see the images up-close. Alternatively, images could be initially hidden from view until the user selects a node to display the images.

At block 306, the system can select a preferred plurality of images from the pluralities of images based on input from a second user. As described above, the user interface 102 can request a client user choose how they wish to indicate their preferences. The client user can select a number of "preferred" image sets and a number of "disliked" image sets. Preferences can relate to how the client user feels about the images, how aesthetically pleasing the images are to the client user, or other indication of preference. In some embodiments, this preference may be binary choice of "liking" the set of images or "disliking" the set of images. In some embodiments, the user can select nodes that are preferred and select nodes that are disliked by clicking on the nodes as displayed in the node link tree diagram. Preferred nodes and disliked nodes can be highlighted using different colors, symbols, shading, or other visual indications. In some embodiments, the positive/negative degree of preference can be expressed as a scale or percentage. In some embodiments, the system can request a specific number of preferred and disliked image sets.

At block 308, the system can display all sets of images in a node tree diagram indicating the preferred set of images. As described above, preferred nodes and disliked nodes can be indicated by color, shading, patterns, gradients, or other visual indications. Different levels of preferences can be indicated by varying visual indicators on the node link tree diagram. As described above, the semantic differences between nodes can be illustrated in various ways. In some embodiments, the distances between nodes can indicate the attenuation in their relationship. In other embodiments, visual indicators on the lines linking nodes can indicate the semantic differences.

FIG. 4 illustrates another example method in accordance with the systems described above. At block 402, the system can generate a plurality of images for each of a plurality of user prompts received from a first user. Block 402 can correspond to blocks 302 of FIG. 3. At block 404, the system can generate a node tree diagram displaying the pluralities of images based on one or more relationships between the pluralities of images. As described above, the semantic differences between nodes can be illustrated with visual indicator linking nodes together. The distance between nodes or visual indications in the lines between nodes can indicate the relationship between nodes.

At block 406, the system can attribute a weight to a disliked plurality of images based on a second user selecting the disliked plurality of images from the pluralities of images. As described above, in some embodiments, a weight can be attributed to preferred and/or disliked image sets. The weight can correspond to the degree of preference or can relate to the image set's semantic relationships with other preferred or disliked image sets. The weight can be updated as additional nodes are added to the node link tree diagram. In some embodiments, if a disliked set of images has a weight exceeding a negative threshold, the corresponding node may be removed from the node link tree diagram, grayed out, or otherwise shaded/highlighted to indicate that it is no longer considered as part of the node link tree diagram. Conversely, preferred sets of images with higher positive weights may be additionally highlighted to illustrate that the set has a higher preference weight than other sets of images. At block 408, the system can remove the disliked plurality of images from the node tree diagram based on the weight.

Figure 5:
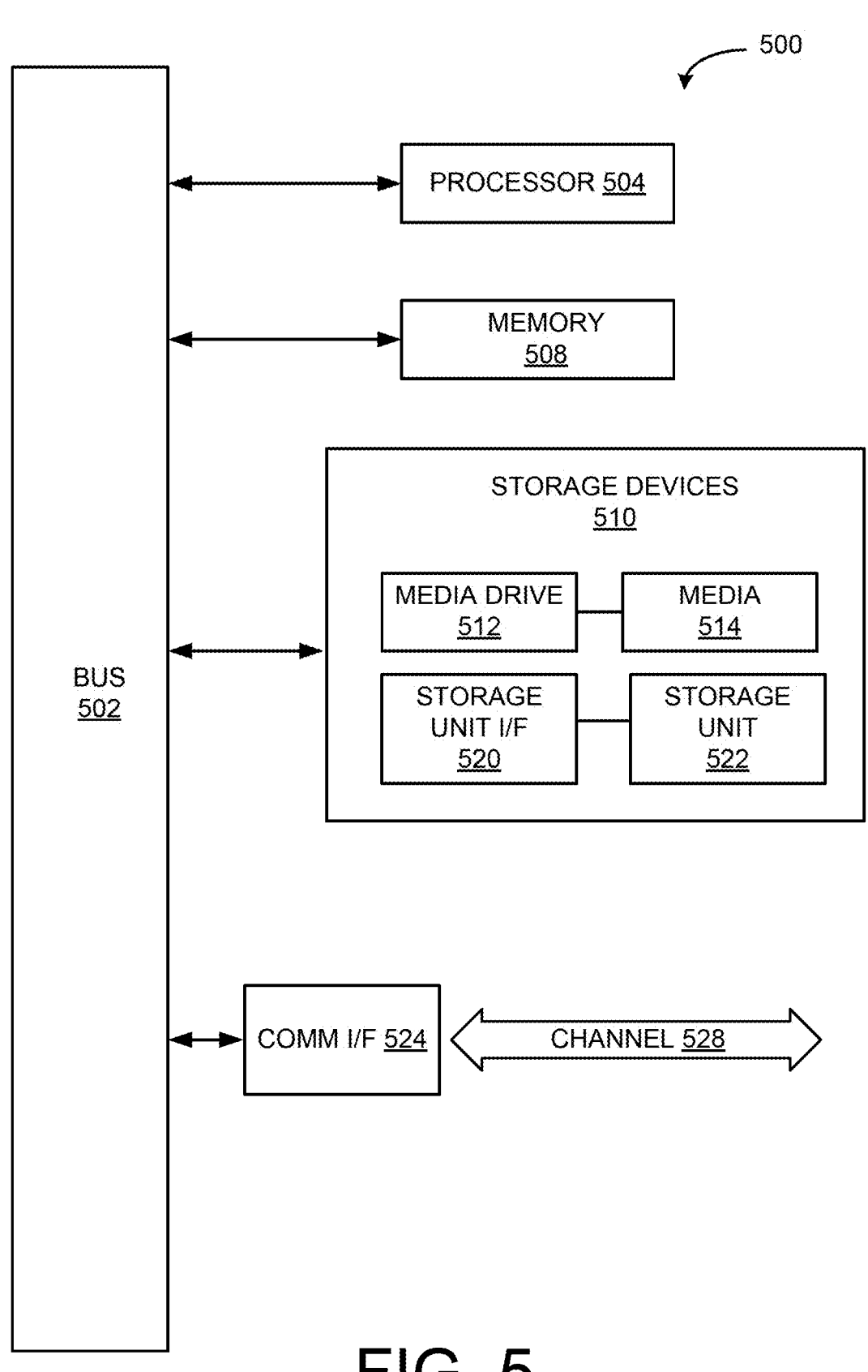
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/ functionalities can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
generating a plurality of images for each of a plurality of user prompts received from a first user;
relating two or more of the pluralities of images and transmitting the related pluralities of images to a second user;
selecting a preferred plurality of images from the related pluralities of images based on input from the second user;
displaying the pluralities of images in a node tree diagram indicating the preferred plurality of images;
receiving input from the second user selecting disliked nodes from the node tree diagram; and
generating a new set of images based on the selected disliked nodes and the preferred plurality of images.

2. The method of claim 1, further comprising:
determining an additional user prompt from the first user corresponds to the preferred plurality of images;
generating an additional plurality of images; and
adding the additional plurality of images to the node tree diagram as being related to the preferred plurality of images.

3. The method of claim 2, further comprising determining that the additional plurality of images is a second preferred plurality of images based on user input from the second user.

4. The method of claim 1, wherein the second user selects the preferred plurality of images from the node tree diagram.

5. The method of claim 1, wherein a machine learning model generates the pluralities of images based on the plurality of user prompts.

6. The method of claim 1, further comprising determining that a plurality of images is a disliked plurality of images based on user input from the second user.

7. The method of claim 6, further comprising attributing a positive weight to the preferred plurality of images and attributing a negative weight to the disliked plurality of images.

8. The method of claim 7, further comprising removing the disliked plurality of images from the node tree diagram based on the negative weight.

9. A user interface, comprising:
a processor; and
a memory encoded with instructions, which when executed by the processor, causes the processor to:
generate a plurality of images for each of a plurality of user prompts received from a first user;
generate a node tree diagram displaying the pluralities of images based on one or more relationships between the pluralities of images and transmitting the node tree diagram to a second user;
attribute a weight to a disliked plurality of images based on receiving input from a second user selecting a node associated with the disliked plurality of images from the node tree diagram;

remove the node associated with the disliked plurality of images from the node tree diagram based on the weight; and
generate a new set of images based on the second user's selecting the node associated with the disliked plurality of images.

10. The user interface of claim 9, wherein a machine learning model generates the pluralities of images based on the plurality of user prompts.

11. The user interface of claim 9, wherein the processor is further configured to determine a preferred plurality of images based on a selection from the second user.

12. The user interface of claim 11, wherein the processor is further configured to:
generate additional pluralities of images based on the preferred plurality of images;
determine preferred or disliked pluralities of images based on selections from the second user;
attribute a weight to each selection;
add preferred pluralities of images to the node tree diagram; and
remove disliked pluralities of images from the node tree diagram.

13. The user interface of claim 9, wherein attributing the weight to the disliked plurality of images is based on the disliked plurality's relationship to other disliked pluralities of images.

14. The user interface of claim 13, wherein the processor is further configured to update the weight of the disliked plurality of images as the other disliked pluralities of images are added to the node tree diagram.

15. The user interface of claim 9, wherein removing the disliked plurality of images from the node tree diagram is based on the weight exceeding a threshold.

16. A non-transitory machine-readable medium having instructions stored therein, which when executed by a processor, cause the processor to:
generate a plurality of images for each of a plurality of user prompts received from a first user;
relate two or more of the pluralities of images and transmit the related pluralities of images to a second user;
attribute a positive weight to a preferred plurality of images based on user selection from the second user;
generate a new set of images based on the second user's interactions with a node tree diagram and the preferred plurality of images;
receive input from the second user selecting disliked nodes from the node tree diagram; and
display all pluralities of images in a node tree diagram indicating the preferred plurality of images and the positive weight.

17. The non-transitory machine-readable medium of claim 16, wherein the processor is further configured to:
determine an additional user prompt from the first user corresponds to the preferred plurality of images;
generate an additional plurality of images; and
add the additional plurality of images to the node tree diagram as being related to the preferred plurality of images.

18. The non-transitory machine-readable medium of claim 17, wherein the processor is further configured to determine that the additional plurality of images is a second preferred plurality of images based on additional user input from the second user.

19. The non-transitory machine-readable medium of claim 16, wherein the second user selects the preferred plurality of images from the node tree diagram.

20. The non-transitory machine-readable medium of claim 16, wherein the processor is further configured to:

attribute a negative weight to a disliked plurality of images based on additional input from the second user selecting the disliked plurality of images from the pluralities of images; and display the disliked plurality of images on the node tree diagram with an indication of the negative weight.

\* \* \* \* \*